(12) United States Patent
Wagh et al.

(10) Patent No.: US 8,332,507 B2
(45) Date of Patent: Dec. 11, 2012

(54) METHOD FOR DETERMINING SERVICE DEMANDS IN A NETWORK LOAD BALANCED SCENARIO

(75) Inventors: Sachin Ashok Wagh, Mumbai (IN); Vikas Gupta, Uttar Pradesh (IN)

(73) Assignee: Infosys Technologies Limited (IN)

( * ) Notice: Subject to any disclaimer, the term of this patent is extended or adjusted under 35 U.S.C. 154(b) by 9 days.

(21) Appl. No.: 12/321,487

(22) Filed: Jan. 21, 2009

(65) Prior Publication Data

US 2010/0017514 A1 Jan. 21, 2010

(30) Foreign Application Priority Data

Jan. 22, 2008 (IN) .............................. 179/CHE/2008

(51) Int. Cl.
*G06F 15/173* (2006.01)
(52) U.S. Cl. ....................................................... 709/224
(58) Field of Classification Search ........... 709/223–226
See application file for complete search history.

(56) References Cited

U.S. PATENT DOCUMENTS

| 7,546,222 B2* | 6/2009 | Chintalapti et al. | 702/186 |
|---|---|---|---|
| 2002/0177977 A1* | 11/2002 | Scarlat et al. | 702/186 |
| 2003/0097428 A1* | 5/2003 | Afkhami et al. | 709/220 |
| 2005/0018611 A1* | 1/2005 | Chan et al. | 370/241 |
| 2005/0177755 A1* | 8/2005 | Fung | 713/300 |
| 2008/0002677 A1* | 1/2008 | Bugenhagen et al. | 370/356 |
| 2008/0016412 A1* | 1/2008 | White et al. | 714/48 |
| 2008/0065702 A1* | 3/2008 | Dickerson et al. | 707/202 |
| 2009/0070457 A1* | 3/2009 | McKinney | 709/224 |
| 2009/0164629 A1* | 6/2009 | Klein et al. | 709/224 |
| 2009/0235104 A1* | 9/2009 | Fung | 713/324 |
| 2009/0240765 A1* | 9/2009 | Wiles, Jr. | 709/203 |
| 2009/0287744 A1* | 11/2009 | Bernardini et al. | 707/202 |

\* cited by examiner

*Primary Examiner* — Jason Recek
(74) *Attorney, Agent, or Firm* — Lerner, David, Littenberg, Krumholz & Mentlik, LLP

(57) ABSTRACT

An approach to determine the service demand of various resources of any individual server (present in a cluster of servers), given the overall transaction throughput and utilization values of these resources, in case of a network load balanced scenario is disclosed. The method proposes a quantitative approach to calculate the transaction throughput of each network load balanced server from the overall transaction throughput, obtained from any commercial performance testing tool. The individual transaction throughputs are calculated using monitored values of network related performance counters of each server and the load balancer obtained from performance testing. Service demands of the resource can be computed using the Utilization law of Queuing Theory once the throughput of that server and utilization of that resource is obtained.

8 Claims, 3 Drawing Sheets

$R_{AC}$ = Bytes received by node A from node C per unit time
$R_{BC}$ = Bytes received by node B from node C per unit time
$R_A$ = Total Bytes received by node A per unit time
$R_B$ = Total Bytes received by node B per unit time
$S_{DA}$ = Bytes sent by node D to node A per unit time
$S_{DB}$ = Bytes sent by node D to node B per unit time
$S_D$ = Total Bytes sent by node D per unit time

US 8,332,507 B2

METHOD FOR DETERMINING SERVICE DEMANDS IN A NETWORK LOAD BALANCED SCENARIO

BACKGROUND OF THE INVENTION

The invention relates generally to the inputs parameters required in performance modeling of complex architectures, and more particularly in determining service demands of individual servers in a network load balanced scenario.

Application performance is one of the key attributes in today's competitive information technology (IT) environment. It is this criterion that makes or breaks the business of various IT service providers. Therefore, it becomes critical for these providers to correctly assess the performance of their application. Accessing performance helps them to compare the performance of their products with that of their competitor's, thereby giving them an opportunity to have an edge over their competitors.

Performance can be evaluated by building predictive performance models that can be used for "What-if" analysis. To build predictive performance models, we require performance parameters viz. the service demands of various devices at various tiers of the application. Traditional methods for building performance models require performance tests to be done using non-clustered environments. This is because in non-clustered environments, the end to end parameters given by performance testing tools can be directly used to calculate service demands.

But, today on many occasions performance tests are conducted using clustered environments due to which the end to end performance parameters given by performance testing tools are not adequate to compute box level service demands.

The methods available today generally use non-clustered environment for performance testing due to which the total throughput given by the load testing tool can be used for service demand computation. The service demands calculated can then be used to build a performance model that can be used for various kinds of "What-if" analysis. In case, clustered environment is used for performance testing the throughput values given by the performance testing tool cannot be used to calculate the box level service demands (i.e. the service demands of the servers present in the cluster).

As mentioned above, if clustered environment is used for performance testing the transaction throughput values given by the performance testing tool cannot be used to calculate the box level service demands. Currently, there is no approach that can obtain throughputs (and hence service demands) on these individual servers of the cluster. Moreover, any performance modeling and simulation exercise requires service demand as an input which makes it further important to have methodologies that can provide service demands in all the possible scenarios.

The existing methods follow a mathematical approach where an assumption is made that the application is scalable which might not be the case in reality. The present inventive method does not require any such assumption for service demand computation of the server machines present in a cluster.

The invention focuses on computing the transaction throughput of each server in a cluster of network load balanced servers by using values from suitable performance counters that have been monitored during performance testing. Thus the inventive method approach neither depends on the routing algorithm of the load balancer nor does it assume application scalability for computing service demands.

Accordingly, a need exists for a method to determine the service demands of individual servers (present in a cluster of servers) given the overall throughput in case of a network load balanced scenario.

BRIEF SUMMARY OF THE INVENTION

In one embodiment of the present technique, the method is used to determine the service demands of individual servers (present in a cluster of servers) given the overall throughput in case of a network load balanced scenario. The method gives the transaction throughput of each network load balanced server from the overall transaction throughput that is obtained from performance testing.

The individual transaction throughputs are calculated using network related performance counters that are monitored during performance testing on each of the servers as well as the load generator. Service demands can be computed using Utilization law of Queuing Theory, once their throughput and utilization values are obtained. The approach is independent of the load balancing algorithm present in the load balancer/router.

In another embodiment of the present technique, a method to obtain the distribution of the overall transaction throughput amongst the available web/application/database servers in a clustered environment is discussed. This is done by monitoring of relevant performance counters on the server machines. The transaction throughput for each server obtained by this technique can then be used to compute their respective service demands using certain queuing theory laws.

The invention focuses on computing the transaction throughput of each server in a cluster of network load balanced servers by using values of suitable performance counters that have been monitored during performance testing. This approach neither depends on the routing algorithm of the load balancer nor does it assume application scalability for computing service demands.

The utility of the invention is to provide inputs (service demands) for performance modeling even when performance testing has been carried out in a clustered environment having a cluster of web/application/database servers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
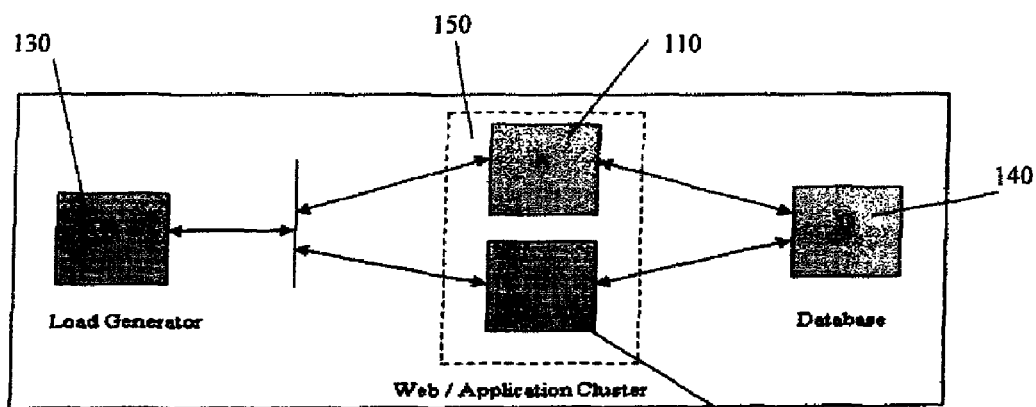
FIG. 1 is an explanation of network bytes transmitted across application tiers in one embodiment of the present technique.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself, and any combination thereof, such as "AB" and/or "BA." It is worth noting that the present discussion relates to exemplary embodiments, and the appended claims should not be limited to the embodiments discussed herein.

The invention is about the inputs parameters required in performance modeling of complex architectures, and more particularly in determining service demands of individual servers in a network load balanced scenario.

In one embodiment of the present technique, the invention focuses on computing the transaction throughput of each server in a cluster of network load balanced servers by using values from suitable performance counters that have been monitored during performance testing. This inventive method neither depends on the routing algorithm of the load balancer nor does it assume application scalability for computing service demands of individual servers (present in a cluster of servers) given the overall throughput in case of a network load balanced scenario.

In another embodiment of the present technique, a quantitative approach to determine the throughputs of the load balanced servers without the load balancing algorithm taken into account is disclosed. The approach proposed herein begins with monitoring the network related performance counters during performance testing. The values obtained by these counters would give primary indicators about the distribution of load in real time in terms of network bytes across the servers. The table below shows network based counters to be monitored on different Operating Systems and the standard monitoring utilities used to monitor these counters.

TABLE 1

Network based counters and tools for different operating systems.

| Operating System | Monitoring Utility | Counters to Monitor | Command |
|---|---|---|---|
| Windows | Perfmon | Bytes Sent/sec and Bytes Received/sec | NA |
| Solaris | Netstat | Bytes Sent/sec and Bytes Received/sec | Netstat - i 2 |
| Linux | SAR | Bytes Sent/sec and Bytes Received/sec | Sar -n DEV 2 10 |

In a typical performance testing scenario, the load generator would fire requests to the application server cluster. Each of these requests would then be redirected by the load balancer to a specific server in the cluster. This process would involve a sequence of network bytes flowing to and fro across application tiers. The method monitors these bytes flowing in and out of each server and then analyzes them with respect to the bytes flowing in and out of the other related servers.

Referring to FIG. 1, that depicts and explains the flow of network bytes transmitted across load generators web/application clusters and database servers.

From the FIG. 1, consider the bytes received/sec and bytes sent/sec of node A/B which is the part of the cluster 150. Node A/B would receive bytes from node C 130 (incoming request) and bytes from node D 140 (response to the query sent by the application server) whereas it would send bytes to node C 130 and node D 140. The Network Bytes received by node A/B will be a fraction of the total Network Bytes sent by node C 130. This percentage can be found out by calculating the Network Bytes received by node A/B to the Network Bytes received by node A 110 and node B 120. The transaction throughput will be distributed in the same ratio as the Network Bytes throughput. Hence, the transaction throughput for any server in a cluster for the FIG. 1 can be computed as below:

$$\text{Throughtput at Node } A/B = \frac{R_A(\text{or } R_B) - \frac{S_{DA}(\text{or } S_{DB})}{(R_A + R_B) - S_D}} * \text{Total Throughput} \quad (1)$$

Where $R_A$=Total Bytes received by Node A per unit time
$R_B$=Total Bytes received by Node B per unit time
$S_{DA}$=Bytes sent by Node D to Node A per unit time
$S_{DB}$=Bytes sent by Node D to Node B per unit time
$S_{DA}$=Total Bytes sent by Node D per unit time The total bytes received by node A 110 would include the bytes received from node D 140 (database) as well. Hence, need to subtract those in order to get the bytes received only from node C 130 (load generator).

In one embodiment of this present technique, commercial performance testing tools used for conducting performance tests will provide the total transaction throughput (from node C 130) whereas monitoring utilities, will monitor the device utilizations and network bytes that are sent and received per unit time on each of the load balanced servers (node A 110 and node B 120). A network monitoring utility such as Ethereal would be used to capture the amount of traffic sent by the machines to each other on a one to one basis like the bytes sent by node D 140 to node A 110 ($S_{DA}$) and node B 120 ($S_{DB}$).

Calculating Service Demands Using Inventive Method

Figure 2:
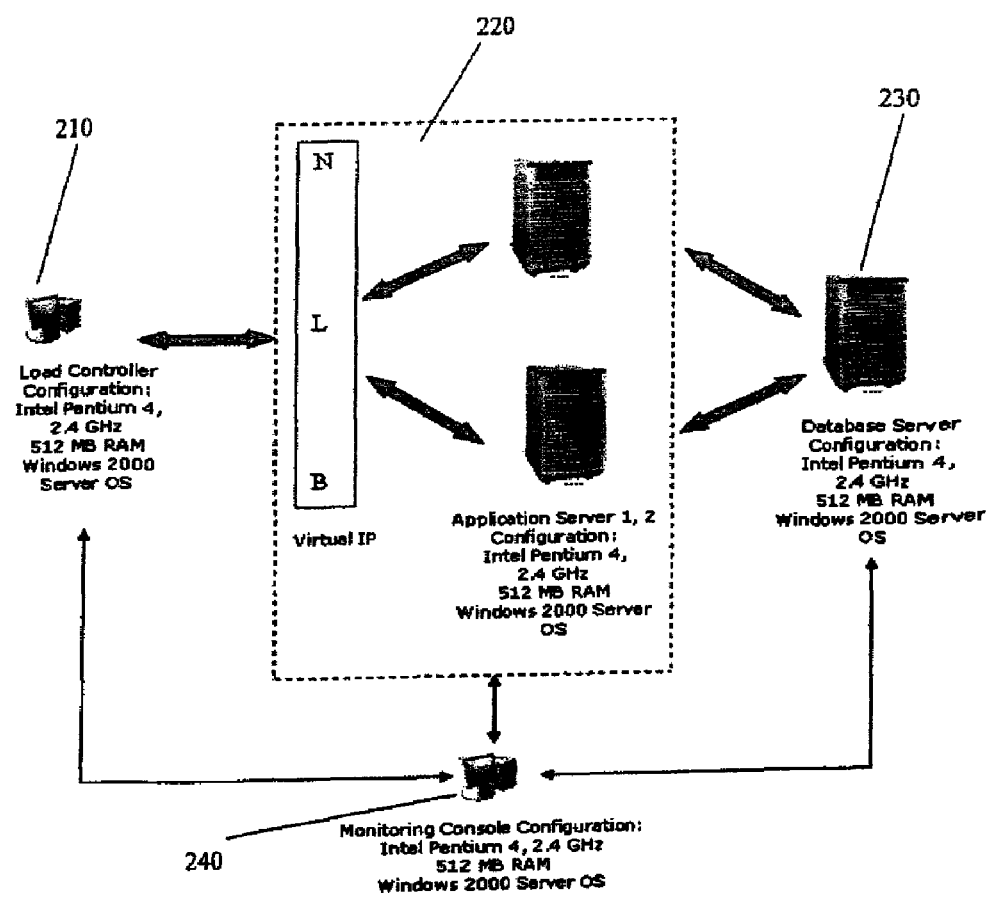
FIG. 2 is an infrastructure setup of servers in load balancing scenario, in one embodiment of the present technique.

Performance tests are conducted using a cluster of application servers. Referring to FIG. 2, the test infrastructure consists of a single load generator 210, a cluster of two network load balanced application servers 220, a single database server 230 and a separate machine 240 to monitor all the other machines in the network. The setup is as shown in FIG. 2.

Referring to FIG. 2, the application servers 220 are machines with Windows 2000 Server operating system. The servers 230 are load balanced using the Windows 2000 Server network load balancing service [NLBO06]. Duwamish [DUWA06] application is setup on both the application servers and the database is setup on a separate database server. Referring to FIG. 2 again, the web requests would reach any of the application servers 220 using the cluster IP (virtual IP). The cluster would redirect the requests to one of the servers using its load balancing algorithm.

In another embodiment of this technique, to determine individual server throughputs is not constrained by the load balancing algorithm implemented on the load balancer.

In yet another embodiment, Ethereal is used as a Packet Capturing Agent (or Network Monitor or Network Analyzer) to capture packets traveling between the various machines or servers. The packets from various machines or servers are captured by placing Ethereal in promiscuous mode.

A standard load testing tool is used for performance testing. A sample search transaction is recorded using Duwamish application over the HTTP protocol. The test script is then parameterized to simulate different search criteria. Isolated performance tests are executed to load the servers with 5, 10 and 15 users respectively during each of the runs. The load testing tool gave the overall throughput and the response times. CPU utilization, Bytes Received/sec and Bytes Sent/sec performance counters are monitored at each of the servers and the load generator by a standard performance monitoring tool and Ethereal.

In one embodiment, the tests conducted for the FIG. 2 scenario may have the following test results.

TABLE 2

Results obtained after executing performance tests in a clustered environment

| Performance Parameters | Test Iterations | | | | | | | | |
|---|---|---|---|---|---|---|---|---|---|
| | Test Run 1 | | | Test Run 2 | | | Test Run 3 | | |
| Parameters from load testing tool | | | | | | | | | |
| No of users | 5 | | | 10 | | | 15 | | |
| Overall Throughput (Transactions/sec) | 27.98 | | | 28.15 | | | 37.833 | | |
| Parameters from the monitoring utilities (Perfmon and Ethereal) | | | | | | | | | |
| | Application Server 1 | Application Server 2 | Database Server | Application Server 1 | Application Server 2 | Database Server | Application Server 1 | Application Server 2 | Database Server |
| % CPU Utilization | 21.08 | 38.83 | 7.482 | 22.22 | 43.85 | 7.692 | 31.39 | 52.18 | 10.512 |
| Bytes Received/sec | 220978 | 548241 | — | 289535 | 639993 | — | 228691 | 491070 | — |
| Bytes Sent/sec to A | — | — | 91159 | — | — | 98213 | — | — | 76910 |
| Bytes Sent/sec to B | | | 208035 | | | 223838 | | | 175854 |
| Calculated Parameters | | | | | | | | | |
| Throughput | 7.7279 | 20.2520 | — | 8.8657 | 19.2842 | — | 12.2962 | 25.5367 | — |
| Service demand | 0.02727 | 0.01917 | 0.0026 | 0.0251 | 0.0227 | 0.0027 | 0.02552 | 0.02043 | 0.0028 |

The above data can be used in the following manner for computing the application server 220 throughputs based on the formula proposed above:

$$X1 = \frac{(220978 - 91158)}{(220978 + 548241 - 91158 - 208035)} * 27.98 \quad (2)$$

$$X2 = \frac{(548241 - 208035)}{(220978 + 548241 - 91158 - 208035)} * 27.98 \quad (3)$$

Equations (2) and (3) give the following results:
X1=7.728 transactions/sec
X2=20.252 transactions/sec
Where X1: Throughput for Application Server 1 in transactions/sec
And X2: Throughput for Application Server 2 in transactions/sec From the throughput values obtained above, the service demands of the application servers 220 can now be calculated using the Utilization Law of queuing theory as shown below:

$$\text{Service Demand at the Service Center} = \frac{\text{Utilization of the Service Center}}{\text{Throughput of the Service Center}} \quad (4)$$

From Equation (4):

$$SD1 = \frac{0.2108}{7.728}$$

$$SD2 = \frac{0.3883}{20.252}$$

SD1=0.02727753 sec
SD2=0.019173389 sec
Where,
SD1: Service Demand at Application Server 1
SD2: Service Demand at Application Server 2
[It is to be noted that above calculations have been shown for the values obtained from Test Run 1.]

Thus a new method to determine the service demands of each of the servers that are load balanced given the overall system throughput is disclosed in one embodiment. This inventive method hinges on monitoring the Bytes Sent/sec and Bytes Received/sec performance counters on each of the servers using a suitable performance monitoring utility and then evaluating the individual throughputs from the counter data. These throughput values can be used to determine the service demands of the load balanced servers which can then be used as inputs to performance modeling. The important part of the method is to monitor the network based counters and then using mathematical techniques to obtain the service demands.

In one embodiment of this present technique, although the experiments and test are conducted using Windows operating system, this new concept can be extended to other operating systems as well by studying their respective network load balancing concepts and monitoring the counters equivalent to Bytes Sent/sec and Bytes Received/sec performance counters.

The utility of the invention is to provide an input (service demands) for performance modeling even when performance testing has been carried out in a clustered environment having a cluster of web/application/database servers.

In another embodiment, the inventive method presents an approach that transforms network throughput (obtained from low level performance counters) to transaction throughput at the box level. And this approach does not require any assumption about application scalability for service demand computation of the server machines present in a cluster using network based performance counters.

Exemplary Computing Environment

Figure 3:
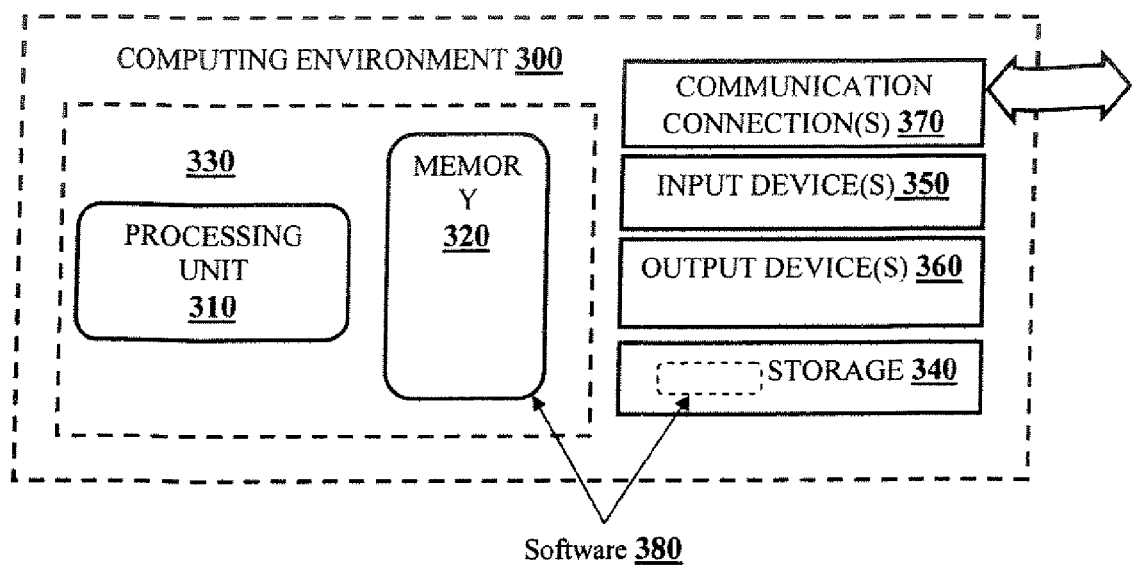
FIG. 3 is a system illustrating a generalized computer network arrangement, in one embodiment of the present technique.

One or more of the above-described techniques may be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 300, computer-readable media include memory 320, storage 340, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

The invention claimed is:

1. A method for determining service demands of at least one server from a server cluster having a plurality of servers in a network load balanced scenario, the method comprising:
    monitoring network based performance counters during transaction performance testing of the plurality of servers and at least one load generator, wherein performance counters of the at least one server comprise bytes received per second by said at least one server, and said performance counters are monitored using a performance monitoring utility;
    measuring percentage of CPU utilization for the at least one server;
    monitoring a total transaction throughput of the server cluster, wherein the total transaction throughput is a rate of transactions processed by the server cluster;
    calculating transaction throughput of the at least one server, wherein the calculated transaction throughput of the at least one server is a function of (i) the total transaction throughput of the server cluster, (ii) bytes received/sec by said at least one server from the at least one load generator, and (iii) total bytes received/sec by the server cluster from the at least one load generator; and
    determining service demand of the at least one server, wherein said service demand is a function of the percentage of CPU utilization measured for said at least one server and the calculated transaction throughput for said at least one server.

2. The method of claim 1, wherein distribution of overall transaction throughput among the plurality of servers in a clustered environment is obtained.

3. The method of claim 2, wherein the plurality of servers is a web server or an application server or a database server or any combination of thereof.

4. The method of claim 1, wherein the calculated transaction throughput of the at least one server is a product of the total transaction throughput and a ratio of (i) the bytes received/sec by said at least one server from the at least one load generator and (ii) the total bytes received/sec by the server cluster from the at least one load generator.

5. The method of claim 1, wherein the service demand of the at least one server is a ratio of the percentage of CPU utilization measured for said at least one server and the calculated transaction throughput for said at least one server.

6. A computer program product comprising a non-transitory computer usable medium having a computer readable program for determining service demands of at least one server from a server cluster having a plurality of servers in a network load balanced scenario, the program comprising:
    monitoring network based performance counters during transaction performance testing of the plurality of servers and at least one load generator, wherein performance counters of the at least one of the server comprise bytes received per second by said at least one server, and said performance counters are monitored using a performance monitoring utility;
    measuring percentage of CPU utilization for the at least one server;
    monitoring a total transaction throughput of the server cluster, wherein the total transaction throughput is a rate of transactions processed by the server cluster;
    calculating transaction throughput of the at least one server, wherein the calculated transaction throughput of the at least one server is a function of (i) the total transaction throughput of the server cluster, (ii) bytes received/sec by said at least one server from the at least one load generator, and (iii) total bytes received/sec by the server cluster from the at least one load generator; and
    determining service demand of the at least one server, wherein said service demand is a function of the percentage of CPU utilization measured for said at least one server and the calculated transaction throughput for said at least one server.

7. The computer program of claim 6, wherein the calculated transaction throughput of the at least one server is a product of the total transaction throughput and a ratio of (i) the bytes received/sec by said at least one server from the at least one load generator and (ii) the total bytes received/sec by the server cluster from the at least one load generator.

8. The computer program product of claim 6, wherein the service demand of the at least one server is a ratio of the percentage of CPU utilization measured for said at least one server and the calculated transaction throughput for said at least one server.

* * * * *